United States Patent [19]
Nguyen

[11] Patent Number: 5,930,264
[45] Date of Patent: Jul. 27, 1999

[54] INTER-NODE SIGNALING FOR PROTOCOL INITIALIZATION WITHIN A COMMUNICATIONS NETWORK

[75] Inventor: Viet Nguyen, Montreal, Canada

[73] Assignee: Telefonaktiebolaget L M Ericsson (publ), Sweden

[21] Appl. No.: 08/796,131

[22] Filed: Feb. 6, 1997

[51] Int. Cl.$^6$ .................................. H04J 3/16; H01J 1/00
[52] U.S. Cl. ............................................ 370/466; 709/227
[58] Field of Search .................................... 370/400, 401, 370/402, 389, 395, 396–397, 398, 409, 466, 467; 455/433, 560, 466; 709/227, 228, 229, 230, 232; 395/200.67, 200.55, 500.57, 200.58

[56] References Cited

U.S. PATENT DOCUMENTS

| | | | |
|---|---|---|---|
| 4,644,532 | 2/1987 | George et al. | 370/94 |
| 5,265,150 | 11/1993 | Helmkamp et al. | 379/58 |
| 5,394,556 | 2/1995 | Oprescu | 395/800 |
| 5,420,572 | 5/1995 | Dolin, Jr. et al. | 340/825.22 |
| 5,475,687 | 12/1995 | Markkula, Jr. et al. | 370/85.1 |
| 5,612,957 | 3/1997 | Gregerson et al. | 370/401 |
| 5,778,187 | 5/1996 | Monteiro et al. | 395/200.61 |

FOREIGN PATENT DOCUMENTS

| | | |
|---|---|---|
| 0 732 661 A1 | 9/1996 | European Pat. Off. . |
| WO 95/30291 | 11/1995 | WIPO . |
| WO 96/35282 | 11/1996 | WIPO . |

OTHER PUBLICATIONS

PCT Standard Search Report, Jan. 20, 1998, PCT/SE98/00061.

*Primary Examiner*—Chi H. Pham
*Assistant Examiner*—Steven Nguyen
*Attorney, Agent, or Firm*—Jenkens & Gilchrist, P. C.

[57] ABSTRACT

A protocol initialization message is generated by an originating node of a communications network for transmission to each of its cooperating nodes in the network. This message identifies the communications protocols and capabilities (industry standardized and proprietary) supported by the originating node. Responsive to the protocol initialization message, cooperating nodes operate to update their data matrices storing protocol and capability information for the originating node, and generate a protocol initialization response for transmission back to the originating node. This response identifies the communications protocols and capabilities (industry standardized and proprietary) supported by the cooperating node. Responsive to the protocol initialization response, the originating node operates to update its data matrix storing protocol and capability information for the cooperating nodes.

13 Claims, 3 Drawing Sheets

INTER-NODE SIGNALING FOR PROTOCOL INITIALIZATION WITHIN A COMMUNICATIONS NETWORK

BACKGROUND OF THE INVENTION

1. Technical Field of the Invention

The present invention relates to communications networks and, in particular, to the communication between nodes of a communications network of protocol initialization information.

2. Description of Related Art

Modern communications networks include tens, if not hundreds, of interconnected nodes. For example, in a modern cellular telephone network, many interconnected switching nodes (commonly referred to as mobile switching centers), database nodes (such as home location registers and visitor location registers), and radio communications nodes (such as base station controllers and base stations) are included. Because of the size of such networks and the inclusion of different types and kinds of nodes, the nodes included in a network may be manufactured by different vendors. In the exemplary cellular telephone network mentioned above, for example, the switching nodes may be manufactured and supplied by multiple different vendors, and the data bases may be manufactured and supplied by yet another vendor. In order for the network to function properly, the included nodes must communicate signaling and control information with each other. This requirement exists even of the nodes are manufactured by different vendors.

To accomplish this goal of compatibility between nodes, specific communications protocols have been defined by the relevant industry for implementation by all vendors for use in their nodes which are incorporated into certain types of networks (such as a cellular telephone network where the TIA/EIA Interim Standard IS-41 has been specified by the industry for inter-switching node communications). To further complicate the matter, the specific communications protocols established for various uses are known to evolve, and thus include a number of different revisions. The previously mentioned IS-41 protocol, for example has proceeded through four different revisions (revs. 0, A, B, and C), and a fifth revision (rev. D) is currently being defined. Unfortunately, the various included nodes in a network do not always utilize the same revision of the industry standardized communications protocol. As backward compatibility is normally a requirement of protocol evolution, this may be of no concern with respect to the implementation of "older" capabilities. However, a particular un-updated node may be unable to properly respond to signaling communication implicating "newer" capabilities. Such incompatibility could adversely affect network operation and the effective provision of network services to users. Furthermore, where backward compatibility is a problem (i.e., it is not supported), knowledge of each version supported is needed.

To still further complicate the matter, many vendors develop, specify and implement proprietary modifications and enhancements to existing industry standardized communications protocols that provide additional network capabilities. Signaling communications from nodes pursuant to such proprietary protocols are only understood by other nodes in the network that are manufactured, supplied and/or licensed by the same vendor. Again, these proprietary protocols evolve, and the various included nodes in a network do not always utilize the same revision of the proprietary communications protocol. The resulting incompatibility could adversely affect network operation and the effective provision of network services to users.

Because of the number of included nodes in a network, the use of multiple vendors as node suppliers, the evolution of industry standardized communications protocols, and the use and evolution of proprietary communications protocols, it is imperative that each node in a network be made aware of the protocol support information for each of its cooperating nodes, and agree as to a protocol to be used for communication. By "cooperating," it is meant those nodes in the network to which the node at issue maintains a direct communications connection. Historically, this goal has been accomplished by manually inputting into a node, for storage in an included data matrix (table), cooperating node protocol support information identifying a supported and agreed upon protocol to be used for communication. Manual maintenance of the data matrices for each node in a network is then required for each network configuration change (for example, due to a node addition or upgrade). This manual updating process is inherently inefficient and subject to error. Accordingly, there is a need for a more efficient mechanism for effectuating a protocol initialization of a network.

SUMMARY OF THE INVENTION

To address the foregoing need, a protocol initialization message is generated by an originating node of a communications network for transmission to each of its cooperating nodes in the network. The protocol initialization message includes protocol information identifying the communications protocols and capabilities supported by the originating node. Such information may identify not only industry standardized protocols and revisions thereto supported by the node, but also any supported proprietary capabilities, protocols and revisions. Responsive to the protocol initialization message, cooperating nodes operate to update their data matrices, and generate a protocol initialization response for transmission back to the originating node. The protocol initialization response includes protocol information identifying the communications protocols and capabilities supported by the cooperating node. Such information may identify not only industry standardized protocols and revisions thereto supported by the cooperating node, but also any supported proprietary capabilities, protocols and revisions. Responsive to the protocol initialization response, the originating node operates to update its data matrix. By evaluating this information, a supported protocol may be agreed upon for communication. Thus, an efficient, accurate and automated process is effectuated for implementing protocol initialization of a communications network.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
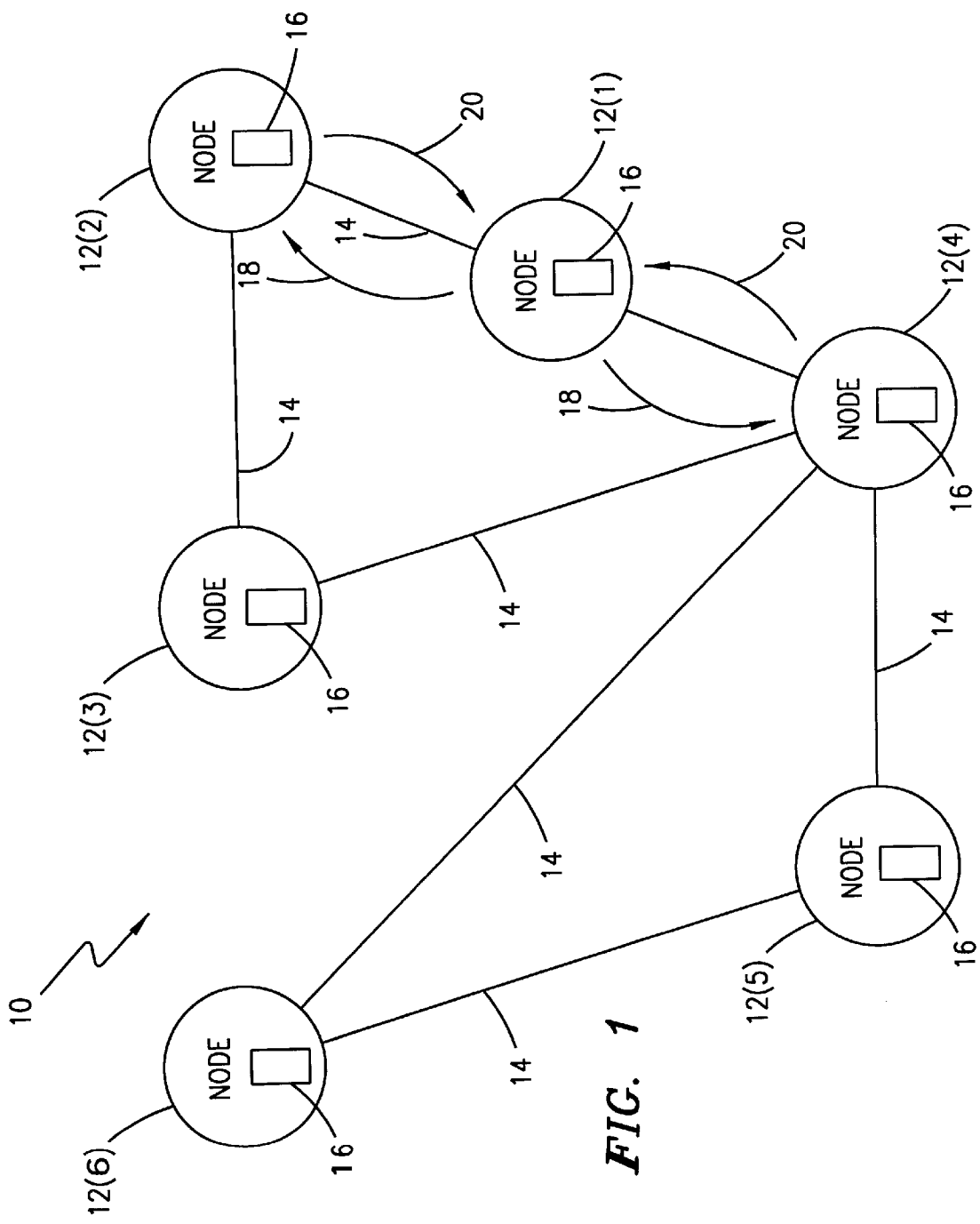
FIG. 1 is a schematic diagram of a multi-node communications network implementing a protocol initialization exchange process in accordance with the present invention.

Reference is now made to FIG. 1 wherein there is shown a schematic diagram of a multi-node communications network 10 in which the present invention may be practiced. The network 10 represents any one of a number of communications networks including telecommunications networks, data communications networks, wide area networks, and the like. The network 10 includes a plurality of nodes 12 interconnected by communications links 14. The nodes 12 may each perform a variety of functions, and furthermore each node may perform a different function, in connection with network 10 operation. The communications links 14 may be of any known type for communicating information (including signaling or control information in an either in-band or out-of-band manner) between the nodes 12. Each node includes a data matrix 16 for storing protocol information identifying the communications protocols supported by each cooperating node. By "cooperating," it is meant those nodes 12 in the network 10 to which the node at issue maintains a direct communications connection via a communications link 14. For example, with respect to node 12(1), its cooperating nodes 12 in the network 10 comprise nodes 12 (2)–12(4). The protocol information stored in the data matrix 16 may identify not only industry standardized protocols and revisions thereto supported by each of the cooperating nodes 12, but also any supported proprietary capabilities, protocols and revisions supported by that node. Storage of this information is important because a node 12 in the network must recognize any protocol related communications limitations and capability limitations of its cooperating nodes before attempting to engage in a communication (especially a signaling or control communication) or perform a function with those nodes.

To insure that each node 12 of the network 10 maintains accurate protocol and capability information in its data matrix 16 for its cooperating nodes, protocol initialization signaling is automatically exchanged between cooperating nodes. Such an exchange may be implemented in any one of a number of situations. For example, the exchange may be implemented whenever a modification to the network 10 occurs. Such a modification may entail the addition or upgrading of a node 12 in the network 10. Furthermore, the exchange may be implemented on a periodic or scheduled basis. Following an exchange, the nodes 12 may process the information to identify a mutually supported protocol that is agreed upon for communication.

Figure 2:
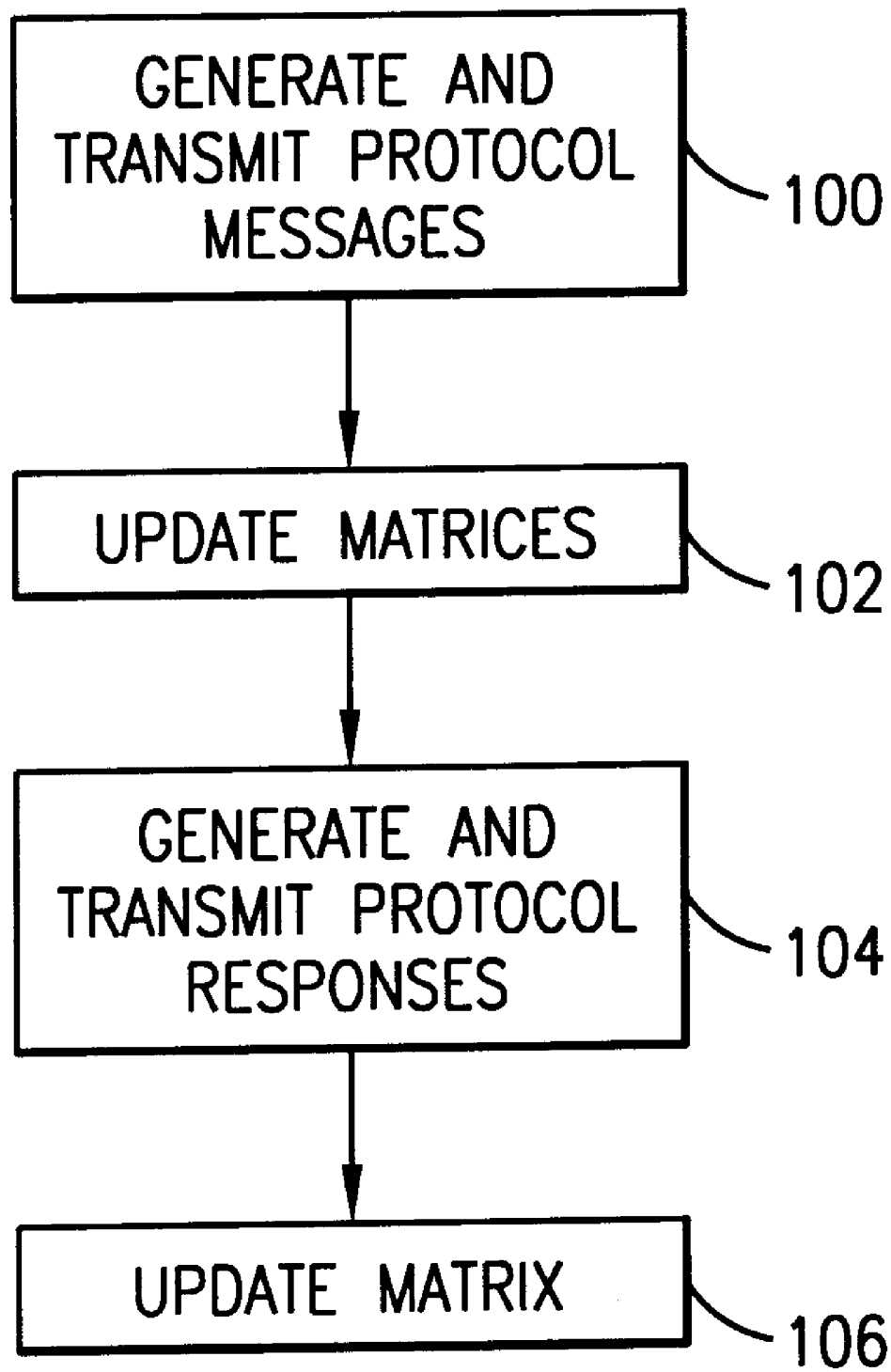
FIG. 2 is a flow diagram for the protocol initialization exchange process of the present invention.

Reference is now additionally made to FIG. 2 wherein there is shown a flow diagram for the protocol initialization exchange process. An originating one of the nodes 12 (illustrated in FIG. 1 for node 12(1)) generates a protocol initialization message 18 for transmission to each of its cooperating nodes in the network 10 (step 100). The protocol initialization message 18 includes protocol information identifying the communications protocols and capabilities supported by the originating node. Such information may identify not only industry standardized protocols and each revision thereto supported by the originating node, but also any supported proprietary capabilities, protocols and revisions. Responsive to the protocol initialization message 18, the cooperating nodes 12 operate to update their data matrices 16 (step 102), and then each generate a protocol initialization response 20 for transmission back to the originating node (step 104). The protocol initialization response 20 includes protocol information identifying the communications protocols and capabilities supported by the cooperating node 12. Such information may identify not only industry standardized protocols and revisions thereto supported by the cooperating node 12, but also any supported proprietary capabilities, protocols and revisions. Responsive to the protocol initialization response 20, the originating node 12 operates to update its data matrix 16 (step 106) Thereafter, a mutually supported protocol may be agreed upon by the nodes for communication.

Figure 3:
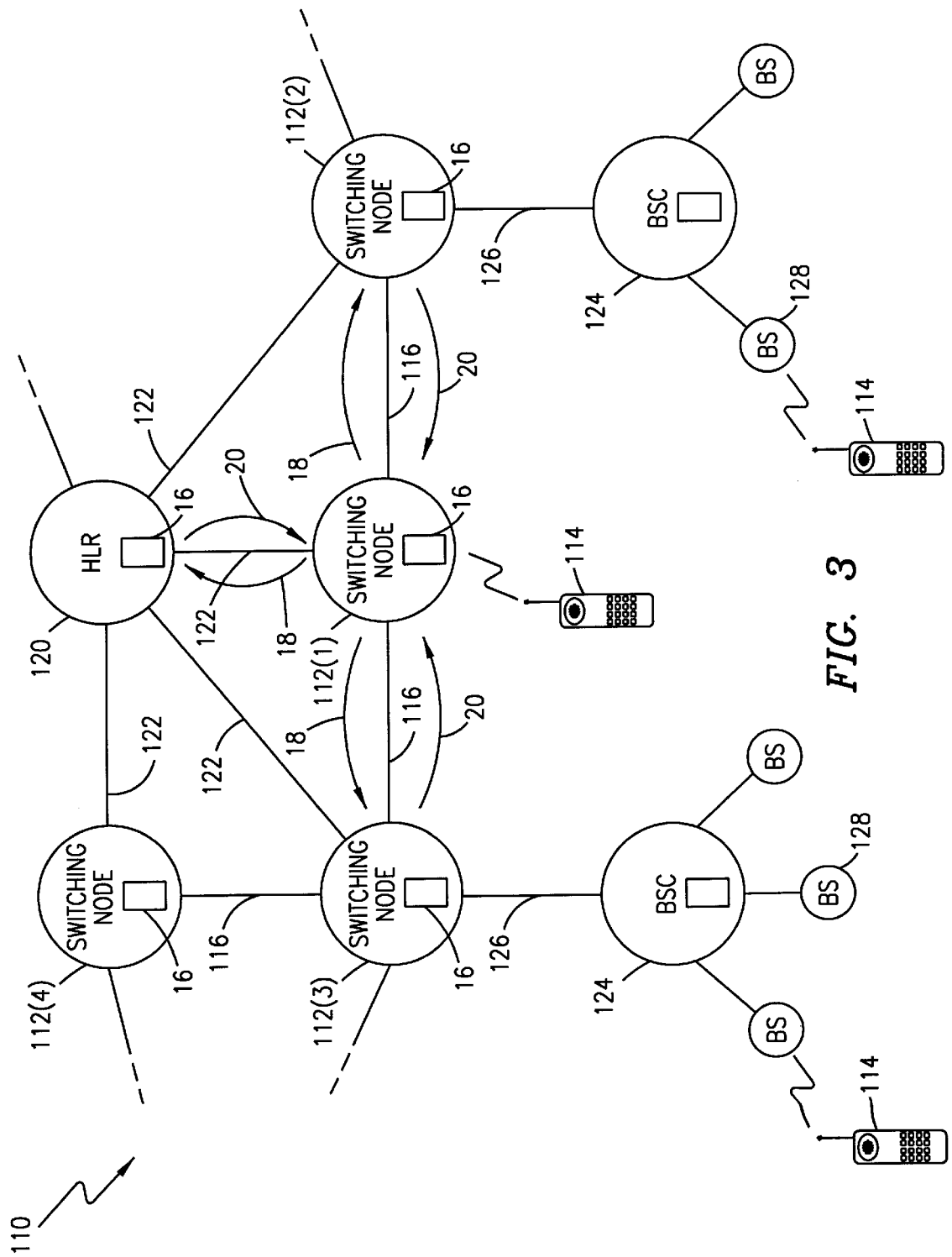
FIG. 3 is a schematic diagram of a cellular telecommunications network implementing the protocol initialization exchange process of the present invention.

Reference is now made to FIG. 3 wherein there is shown a schematic diagram of a cellular telecommunications network 110 including a plurality of interconnected switching nodes (SN) 112. Although only four switching nodes 112 are shown, it will be understood that the network 110 likely includes many more interconnected nodes. The switching nodes 112 may comprise any one of a number of known telecommunications switching devices, including those commonly used and known in the art for providing either digital or analog cellular telephone service to a plurality of mobile stations (MS) 114. The switching nodes 112 are interconnected with each other for communication via communications links 116 providing both voice trunks and signaling connections using known communications protocols (such as ISUP, R1 or R2, and/or IS-41). The switching nodes 112 are also connected to a data base node 120 comprising a home location register (HLR) by means of communications links 122 providing a signaling connection using known communications protocols (such as Mobile Application Part (MAP) or IS-41). Some switching nodes 112 are further connected to at least one associated base station controller (BSC) node 124 via a communications link 126 providing both voice trunks and signaling connections using known communications protocols implementing an "A interface." The base station controller (BSC) nodes 124 and certain ones of the switching nodes 112 are each connected to a plurality of base station nodes 128 providing for radio frequency communications with the mobile stations 114.

It is recognized that in the network 110, like with the network 10 of FIG. 1, the various included nodes (112, 120, 124 and 128) may be supplied by different vendors. Furthermore, it is recognized that each node may support different versions of certain industry standardized communications protocols (like IS-41), different functionalities, and different proprietary communications protocols. Accordingly, each node includes a data matrix (table) 16 for storing protocol information identifying the communications protocols and capabilities supported by each cooperating node. By "cooperating," it is meant those nodes in the network 110 to which the node at issue maintains a direct communications connection via a communications link. The protocol information stored in the data matrix 16 may identify not only industry standardized protocols and each revision thereto supported by each of the cooperating nodes, but also any supported proprietary capabilities, protocols and revisions supported by that node. Storage of this information is important because a node in the network 110 must recognize any protocol related communications limitations and capability limitations of its cooperating nodes before attempting to engage in a communication (especially a signaling or control communication) or perform a function with those nodes.

Specific reference is now made for exemplary purposes to switching node 112(1). Its cooperating nodes 112 in the network 110 include switching nodes 112(2)–112(3) and home location register 120. Switching node 112(4) is not a cooperating node with respect to switching node 112(1) because no direct communications link 116 exists therebetween. To insure that the each node of the network 110 maintains accurate protocol and capability information in its data matrix 16 for its cooperating nodes, protocol initialization signaling is automatically exchanged between 15 cooperating nodes. Such an exchange may be implemented in any one of a number of situations. For example, the exchange may be implemented whenever a nodal modification to the network 110 occurs. Such a modification may entail the addition or upgrading of a switching node 112 in the network 110. Furthermore, the exchange may be implemented on a periodic or scheduled basis.

An originating one of the switching nodes 112 (in this example, switching node 112(1)) generates a protocol initialization message 18 for transmission to each of its cooperating switching nodes 112(2)–112(3) and cooperating home location register 120 in the network 110. The protocol initialization message 18 includes protocol information identifying the communications protocols and capabilities supported by the originating switching node 112(1). Such information may identify not only industry standardized protocols and revisions thereto supported by the originating node, but also any supported proprietary capabilities, protocols and revisions. In the event backward compatibility is a problem, each supported revision, rather than only the latest supported revision, is identified. Responsive to the protocol initialization message 18, the cooperating switching nodes 112(2)–112(3) and cooperating home location register 120 operate to update their respective data matrices 16, and then each generate a protocol initialization response 20 for transmission back to the originating switching node 112(1). The protocol initialization response 20 includes protocol information identifying the communications protocols and capabilities supported by the sending cooperating switching node 112 or home location register 120. Such information may identify not only industry standardized protocols and revisions thereto supported by the cooperating switching node 112 or home location register 120, but also any supported proprietary capabilities, protocols and revisions. Again, in the event backward compatibility is a problem, each supported revision, rather than only the latest supported revision, is identified. Responsive to the protocol initialization response 20, the originating switching node 112(1) operates to update its data matrix 16. The nodes 112 may then agree on a mutually supported protocol for communications.

In this example, as illustrated in FIG. 3, switching node 112(1) is supplied by vendor Alpha, and has just now been upgraded to support IS-41 revision C (as well as revisions 0, A and B) and Alpha proprietary protocol A-41 revision 2 (as well as revisions 0 and 1) with respect to inter-switch communications. Meanwhile, switching node 112(2) is also supplied by vendor Alpha, and supports IS-41 revision B (as well as revisions 0 and A) and Alpha proprietary protocol A-41 revision 1 (as well as revision 0) with respect to inter-switch communications. Switching node 112(3), on the other hand, is supplied by vendor Beta, and supports IS-41 revision A (as well as revision 0) with no proprietary protocols. Finally, home location register 120 is supplied by vendor Gamma, and supports IS-41 revision C (as well as revisions 0, A and B) with no proprietary protocols. As the upgrading of switching node 112(1) comprises a nodal modification to the network 110, protocol initialization signaling in accordance with the present invention is automatically triggered. Although described herein as providing information on each supported revision of a protocol, it is understood that in the event backward compatibility is supported only an identification of the most recent supported revision need be made.

Originating switching node 112(1) generates a protocol initialization message 18 for transmission to each of its cooperating switching nodes 112(2)–112(3) and the home location register 120 in the network 110. The protocol initialization message 18 includes protocol information identifying its supported IS-41 revisions 0, A, B and C and Alpha proprietary protocol A-41 revisions 0, 1 and 2 communications protocols and capabilities. Responsive to the protocol initialization message 18, the cooperating switching nodes 112(2)–112(3) and the home location register 120 operate to update their respective data matrices 16 to identify switching node 112(1) support of the IS-41 revisions 0, A, B and C and Alpha proprietary protocol A-41 revisions 0, 1 and 2 communications protocols. The cooperating switching nodes 112(2) and 112(3), as well as the home location register 120, then each generate a protocol initialization response 20 for transmission back to the originating switching node 112(1). The protocol initialization response 20 includes supported protocol information. For example, the switching node 112(2) identifies its support of the IS-41 revisions 0, A and B and Alpha proprietary protocol A-41 revisions 0 and 1 communications protocols and capabilities. The switching node 112(3) identifies its support of IS-41 revisions 0 and A communications protocols and capabilities. Further, the home location register 120 identifies its support of the IS-41 revisions 0, A, B and C communications protocols and capabilities. Responsive to the protocol initialization response 20, the originating switching node 112(1) operates to update its data matrix 16 to identify support, with respect to each cooperating node, of the identified communications protocols and capabilities.

Now that each node 112 and 120 is aware of the communications protocols and capabilities supported by its cooperating nodes, an agreement can be reached as to the mutually supported protocol to be used, and appropriate control over inter-switching node communications may be effectuated. Thus, for switching nodes 112(1) and 112(2), use of either or both the IS-41 revisions 0, A and B and Alpha proprietary protocol A-41 revisions 0 and 1 communications protocols and capabilities may be made. The IS-41 revision C and Alpha proprietary protocol A-41 revision 2 communications protocols and capabilities supported by switching node 112(1) cannot be used because they are not supported by switching node 112(2). For switching nodes 112(1) and 112(3), only the IS-41 revisions 0 and A communications protocols and capabilities are supported for inter-switching node communications. The IS-41 revisions B and C and Alpha proprietary protocol A-41 revisions 0, 1 and 2 communications protocols and capabilities supported by switching node 112(1) cannot be used because they are not supported by switching node 112(3). Furthermore, for the switching node 112(1) and home location register 120, only the IS-41 revisions 0, A, B and C communications protocols and capabilities are supported for inter-node communications. The Alpha proprietary protocol A-41 revisions 0 and 1 communications protocols and capabilities supported by switching node 112(1) cannot be used because they are not supported by the home location register 120. Accordingly, it is recognized that each node preferably selects the latest protocol revision and highest level of service shared by it and its cooperating node.

The foregoing discussion focused on the exchange of communications protocol and capability information between the switching nodes 112 and the home location register 120. It will, however, be understood that such an exchange may be accomplished between any of the nodes 112, 120, 124 and 128 of the network 110, as is needed to support communications.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for updating a data matrix of a network node, the data matrix storing protocol and capability information for cooperating network nodes, the method comprising the steps of:

generating a protocol initialization message identifying communications protocols and capabilities supported by a first network node, the communications protocols and capabilities comprising at least one industry standardized protocol and at least one proprietary capability;

transmitting the protocol initialization message from the first network node to each second network node in a cooperating node position with respect to the first network node; and storing, in a data matrix for each second network node, data identifying the communications protocols and capabilities supported by the first network node for subsequent use in identifying appropriate communications protocols and capabilities for communicating between the first and second network nodes, wherein the data is stored in a location of the data matrix associated with the first network node.

2. The method as in claim 1 wherein the first and second network nodes comprise switching nodes in a telecommunications network.

3. The method as in claim 2 wherein the at least one industry standardized protocol is defined by Interim Standard IS-41 related protocol information.

4. The method as in claim 3 wherein the Interim Standard IS-41 related protocol information comprises an identification of a particular Interim Standard IS-41 revision supported by the first network node.

5. The method as in claim 1 wherein the first and second nodes comprise switching nodes in a telecommunications network, and the identified communications protocols and capabilities comprise vendor switching node specific proprietary protocols and capabilities supported by the first network node.

6. The method as in claim 1 wherein the cooperating node position comprises a direct communications link connection between the first and the second network nodes.

7. A method for updating nodes in a network as to supported communications protocols and capabilities, comprising the steps of:

generating a protocol initialization message identifying communications protocols and capabilities supported by a first node;

transmitting the protocol initialization message from the first node to each second node in a cooperating node position with respect to the first node;

storing, in each second node, first data identifying the communications protocols and capabilities supported by the first network node, wherein the first data is stored in a location of the second node associated with the first node;

generating, for each second node, a protocol initialization response identifying communications protocols and capabilities supported by the second node, the step of generating a protocol initialization response for each second node performed in response to the protocol initialization message;

transmitting the protocol initialization response from each second node to the first node;

storing, in the first node, second data identifying the communications protocols and capabilities supported by the respective second nodes, wherein the second data is stored in a location of the first node associated with the second node.

8. The method as in claim 7 wherein the first and second nodes comprise switching nodes in a telecommunications network, and the identified communications protocols and capabilities comprise industry standardized protocols and capabilities supported by the respective first and second nodes.

9. The method as in claim 8 wherein the industry standardized protocols and capabilities are defined by Interim Standard IS-41 related protocol information.

10. The method as in claim 9 wherein the Interim Standard IS-41 related protocol information comprises an identification of a particular Interim Standard IS-41 revision supported by the respective first and second nodes.

11. The method as in claim 7 wherein the first and second nodes comprise switching nodes in a telecommunications network, and the identified communications protocols and capabilities comprise vendor switching node specific proprietary protocols and capabilities supported by the respective first and second nodes.

12. The method as in claim 7 further including the step of utilizing the identified communications protocols and capabilities supported by the first and second nodes to identify appropriate communications protocols and capabilities for communicating between the first and second nodes.

13. The method as in claim 7 wherein the cooperating node position comprises a direct communications link connection between the first and the second network nodes.

* * * * *

UNITED STATES PATENT AND TRADEMARK OFFICE
CERTIFICATE OF CORRECTION

PATENT NO. : 5,930,264
DATED : Jul. 27, 1999
INVENTOR(S) : Nguyen

It is certified that error appears in the above-identified patent and that said Letters Patent is hereby corrected as shown below:

Column 4, line 66      After "between"
                                      Remove --15--

Signed and Sealed this

Eighteenth Day of April, 2000

Attest:

Q. TODD DICKINSON

Attesting Officer                        Director of Patents and Trademarks